United States Patent [19]
Riley

[11] Patent Number: 5,896,138
[45] Date of Patent: Apr. 20, 1999

[54] PROCESS CONTROL WITH GRAPHICAL ATTRIBUTE INTERFACE

[75] Inventor: Kenneth P. Riley, Round Rock, Tex.

[73] Assignee: Fisher Controls International, Inc., Clayton, Mo.

[21] Appl. No.: 07/958,046

[22] Filed: Oct. 5, 1992

[51] Int. Cl.$^6$ .................................................. G06F 17/60
[52] U.S. Cl. ............................................................ 345/440
[58] Field of Search ...................... 395/155, 159, 395/161, 152, 153; 364/188, 184, 185, 550, 551.01; 345/440

[56] References Cited

U.S. PATENT DOCUMENTS

| | | | |
|---|---|---|---|
| 4,512,747 | 4/1985 | Hitchens et al. | 434/428 |
| 4,628,470 | 12/1986 | Baumann | 702/173 |
| 4,679,137 | 7/1987 | Lane et al. | 364/188 |
| 4,792,888 | 12/1988 | Agarwal et al. | 364/188 |
| 4,805,089 | 2/1989 | Lane et al. | 364/188 |
| 4,833,622 | 5/1989 | Barto et al. | 364/528.06 |
| 4,862,345 | 8/1989 | Lekron . | |
| 4,862,376 | 8/1989 | Ferriter et al. . | |
| 4,873,623 | 10/1989 | Lane et al. | 364/188 |
| 4,885,694 | 12/1989 | Pray et al. . | |

(List continued on next page.)

FOREIGN PATENT DOCUMENTS

| | | |
|---|---|---|
| A 0 389 132 | 9/1990 | European Pat. Off. . |
| WO-A 9 106 050 | 5/1991 | European Pat. Off. . |
| A 0 483 035 | 4/1992 | European Pat. Off. . |

OTHER PUBLICATIONS

Bergan et al., "Multimedia Interface Design in Process Control", IEE Colloquium on Interactive Multimedia: A Review and Update for Potential Users, IEE (Sep. 1992), pp. 9/1–9/6.

Hossain et al., "Computer–Aided Monitoring and Controlling of a Real–time Industrial Process Using Video Animations", Conference Record of the 1991 IEEE Industrial Applications Society Annual Meeting, IEEE (1991), vol. 2, pp. 1685–1691.

Thalimer, "Design of a Continuous Miner Motor Monitoring System", IEEE Industry Applications Society Annual Meeting (1989), pp. 1576–1579.

English Translation (pp.1–24) of Knoop et al., "Optimal Person–Machine Interface for the Control of Electric Power Grids," Elektrotechnische Zietschrift, vol. 109 No. 12 (Jun. 1988), pp. 532–537.

F. Knoop and G. Schinze, "Opitmale Mensch–Machine–Schnittstelle zur Fuhrung von Versorgungsnetzen", Elektrotechnische Zeitschrift, vol. 109, No. 12, Jun. 1988, Berlin, Germany, pp. 532–537.

Primary Examiner—Anton Fetting
Attorney, Agent, or Firm—Arnold, White & Durkee

[57] ABSTRACT

Process attributes such as, for example, the identification of process elements, the characteristics of process elements, and the states of the variables produced by the process elements, are displayed substantially simultaneous with a graphical representation of a process under control. After displaying a graphical representation of a process being controlled (the graphical representation including icon representations of process elements), a user selects a portion of the graphical representation for which the underlying process attributes are to be displayed. This selection may be accomplished by selecting an icon image of a process element for which the attributes are to be displayed. After selection, the underlying attributes are displayed substantially simultaneously with the display of the graphical representation, for example, by overlaying a dialogue box on top of the graphical representation containing indicia of the underlying attributes. The attributes that are included in the dialogue box may be entered manually, or may be generated automatically by use of a historical data base, or may be created through any combination of manual entry or automatic generation.

5 Claims, 8 Drawing Sheets

U.S. PATENT DOCUMENTS

| | | | |
|---|---|---|---|
| 4,967,381 | 10/1990 | Lane et al. | 702/81 |
| 5,005,116 | 4/1991 | Fujita et al. | 364/188 |
| 5,019,961 | 5/1991 | Addesso et al. | |
| 5,023,817 | 6/1991 | An et al. | 702/183 |
| 5,032,978 | 7/1991 | Watson et al. | 364/188 |
| 5,113,350 | 5/1992 | Sargent | 364/479.09 |
| 5,226,118 | 7/1993 | Baker et al. | 345/357 |
| 5,241,482 | 8/1993 | Iida et al. | 364/188 X |
| 5,251,152 | 10/1993 | Notess | 395/200.54 |
| 5,253,160 | 10/1993 | Lin | 364/188 |
| 5,253,184 | 10/1993 | Kleinschnitz | 702/184 |
| 5,271,045 | 12/1993 | Scarola et al. | 364/188 X |
| 5,321,626 | 6/1994 | Palladino | 702/63 |
| 5,353,400 | 10/1994 | Nigawara et al. | 345/334 |

FIG. 3

EDIT ATTRIBUTES

| | |
|---|---|
| TAG | FT030-1 |
| SIGNAL TYPE | ANALOG |
| SIGNAL DIRECTION | OUTPUT |
| DEVICE | UOC1-15 |
| ADDRESS | 1-1-6 |
| EU UNITS | ma |
| EU LOW VALUE | 4 |
| EU HIGH VALUE | 20 |

[ OK ]  [ CANCEL ]

202A — labels group
203A — values group
201A — window

FIG. 4

EDIT ATTRIBUTES

| | |
|---|---|
| VALVE NAME | KETTL 1A OUTFLOW |
| VALVE TYPE | STANDARD 4 INCH |
| PART NUMBER | VS-0004 |
| MANUFACTURER | FISHER CONTROLS |
| SPEC SHEET | VS0004 DWG |
| MAINTENANCE DATA | 1 - OCT - 1992 |

[ OK ]  [ CANCEL ]

EDIT ATTRIBUTES

| | |
|---|---|
| TAG | FIC - 409 |
| DESCRIPTION | VAPOR FLOW RATE |
| UNITS | GPM |
| LOW EU | 0.00 |
| HIGH EU | 40.00 |
| LOW ALARM | 5.00 |
| HIGH ALARM | 30.00 |
| SET POINT | 18.00 |
| PROCESS VARIABLE | 21.45 |

[ OK ]  [ CANCEL ]

202C, 203C, 201C

PROCESS CONTROL WITH GRAPHICAL ATTRIBUTE INTERFACE

BACKGROUND OF THE INVENTION

The present invention relates to a computer-based process controller, and more particularly to a computer-based process controller including graphical display of selected process attributes.

Processing plants typically include a series of operations in which liquid, gas and solid materials are transported, heated, mixed, chemically treated, cooled, pressurized or otherwise processed. Each of the operations in a processing plant are monitored and controlled to ensure that each is performed according to some predetermined specification or criteria. The monitoring and control typically requires instrumentation including sensors for various process conditions, transmitters for transmitting the sensed data to a computer-based controller, a computer-based controller that receives the transmitted sensed data and that takes appropriate control action based on the sensed data, and controlled elements within the process such as valves, pumps, conveyors, heating or cooling elements, alarms, and the like, which are connected to and controlled by the process controller in order to maintain the sensed process conditions within predetermined desired limits to thereby control the operation of interest.

Typical processing plants, such as oil refineries, petrochemical plants, food processing plants, or drug processing plants, may include operations that have tens or hundreds of such so-called "loops", each of which may contain any type of sensor and transmitter, the computer-based controller, and any type of controlled element. Such loop-based operations are typically represented by loop drawings or loop sheets which graphically illustrate the loop or loops of the operation of interest.

With the advent of Computer-Aided Design (CAD) programs, loop drawings are created and stored in a computer memory, and are displayed on a display screen, thus simplifying the creation and maintenance of loop sheets. With such CAD programs, creation of the loop sheets was accomplished by an operator instructing the computer, using a digitizer or mouse, to place and connect graphical representations of the components of the operation on the display screen of the computer-based controller.

Such CAD programs and computer-based process controllers also facilitated the maintenance of historical data related to the operation under control. Such data historians operate much like flight recorders on aircraft, and serve to record a history of the states and other attributes of all control elements in an operation. The maintenance of such historical data has proven particularly critical when the operation being controlled relates to the manufacture of foods and/or drugs.

Typical data historians simply keep track of all attributes of all components of the operation under control, and maintain the data history in a large history data base. Then, when review of the history data base is desired, for example, after the detection of a process upset or other error, the history data base is output in the form of a spread sheet, thus permitting a system operator to analyze the historical data to determine the cause of the upset or error. During such an analysis, an operator reviews the spread sheet of historical data, in combination with a loop sheet drawing, to render conclusions, for example, as to the cause of the upset or other error. Such analyses have proven difficult because large portions of the history data base may not be relevant to the particular loop or process upset under consideration. In addition, correlating the data history with a loop sheet of interest to determine the history of a particular component of the operation of interest, often proves time consuming and occasionally results in errors.

There is therefore a need to provide an easier method to correlate data history with individual components in a computer-based process controller.

SUMMARY OF THE INVENTION

The invention largely obviates the above-noted discrepancies in the prior art by providing a graphical interface for display of process attributes, substantially simultaneous with the display of the graphical representation of a process being controlled.

The invention contemplates displaying a graphical representation of a process being controlled, for example, in the form of icon representations of process elements; selecting a portion of the graphical representation for which underlying process attributes are to be displayed, for example, by selecting an icon representation of a desired process element; and displaying the underlying process attributes of the selected portion of the graphical representation substantially simultaneous with the display of the graphical representation.

The display of the process attributes may take the form of a dialogue box which is overlaid on top of the graphical representation of the process being controlled thus permitting the substantially simultaneous display of the graphical representation and underlying process attributes.

The process attributes that may be displayed in accordance with the present invention may be virtually any attribute that is associated with a process element. For example, process attributes may include the identity of the process element including its part number, drawing number, manufacturer, and the like, the characteristics of the process element including, for example, the physical and electrical characteristics including the engineering units and range of the output signal produced by the process elements, and the state history of the process element, for example, the state of the output of a process element for a particular point in time.

Attributes that may be displayed in accordance with the present invention include static attributes and dynamic attributes. Static attributes (for example, element identity and characteristics) may be entered manually, whereas dynamic characteristics (for example, output state) may be derived from a historical data base, and formatted for inclusion among the attributes to be displayed.

These and other features and advantages of the present invention will become apparent to those of ordinary skill in this art with reference to the figures and following detailed description.

BRIEF DESCRIPTION OF THE DRAWINGS

FIGS. 3–5 are additional examples of graphical attribute interfaces, in accordance with the present invention.

3

Figure 7:
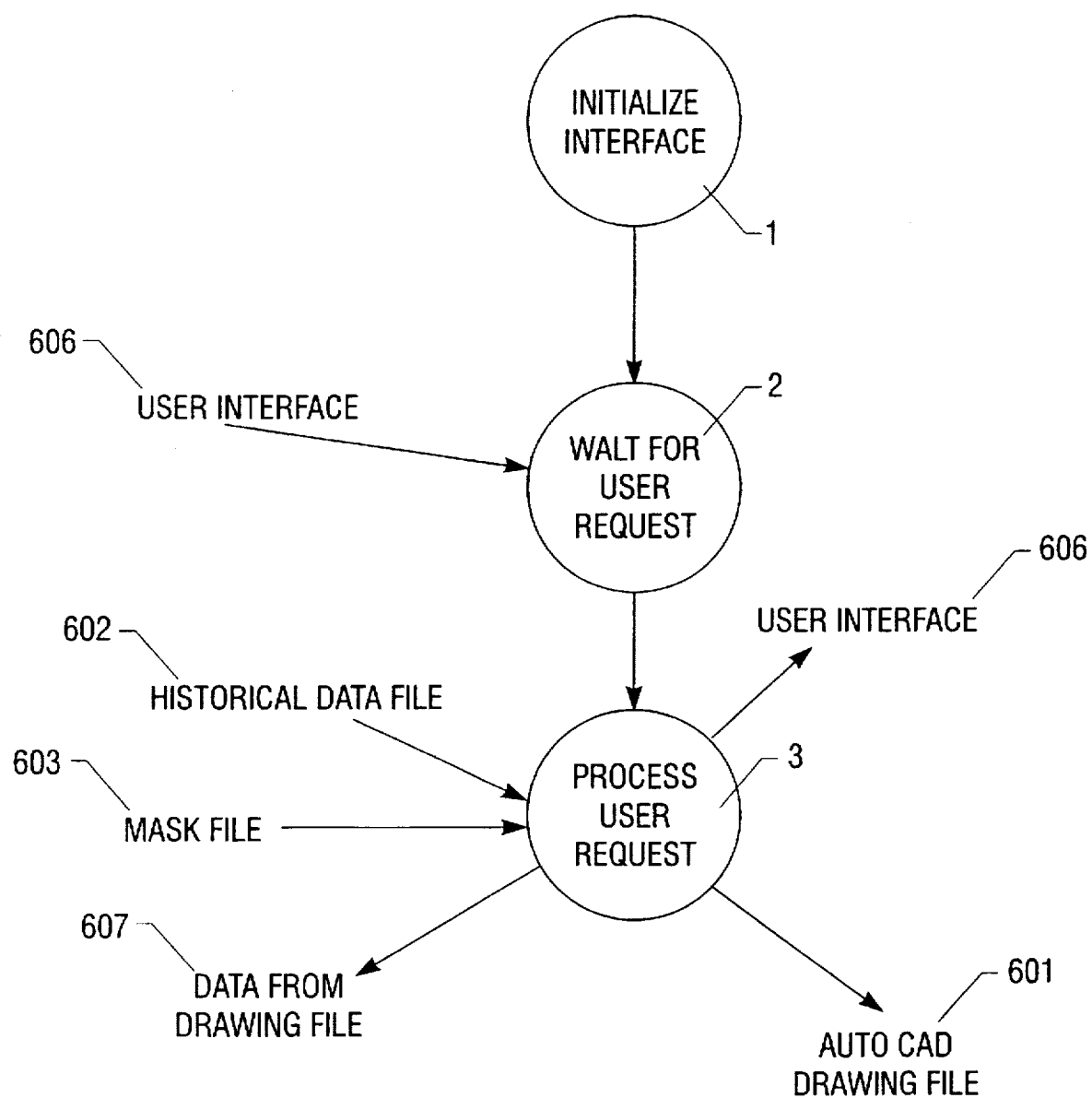
FIG. 7 is a flow chart showing the logic of the graphical attribute interface of the present invention.
Figure 8:
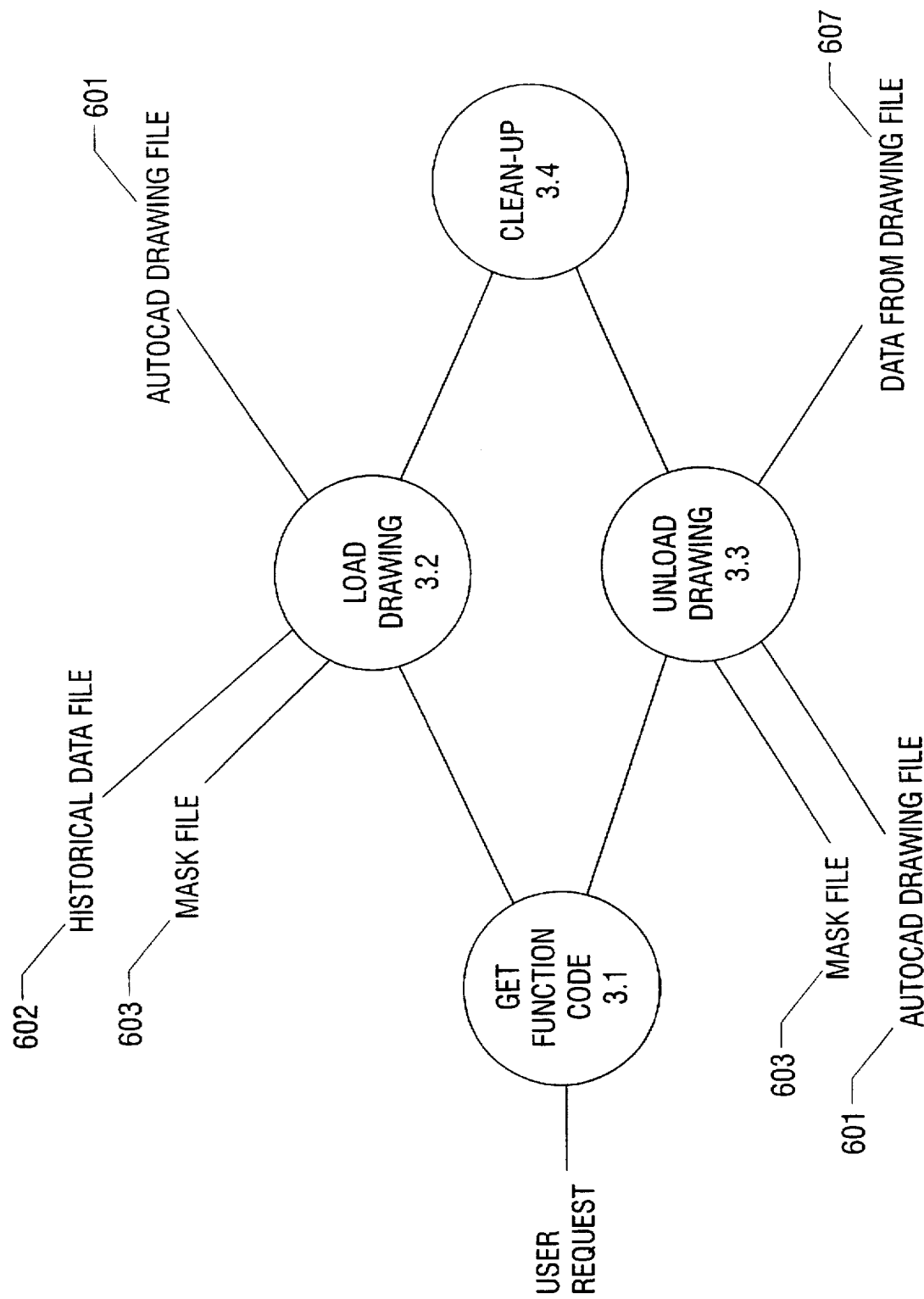

FIG. 8 is a flow chart showing in more detail the process user request function of FIG. 7.

Figure 9:
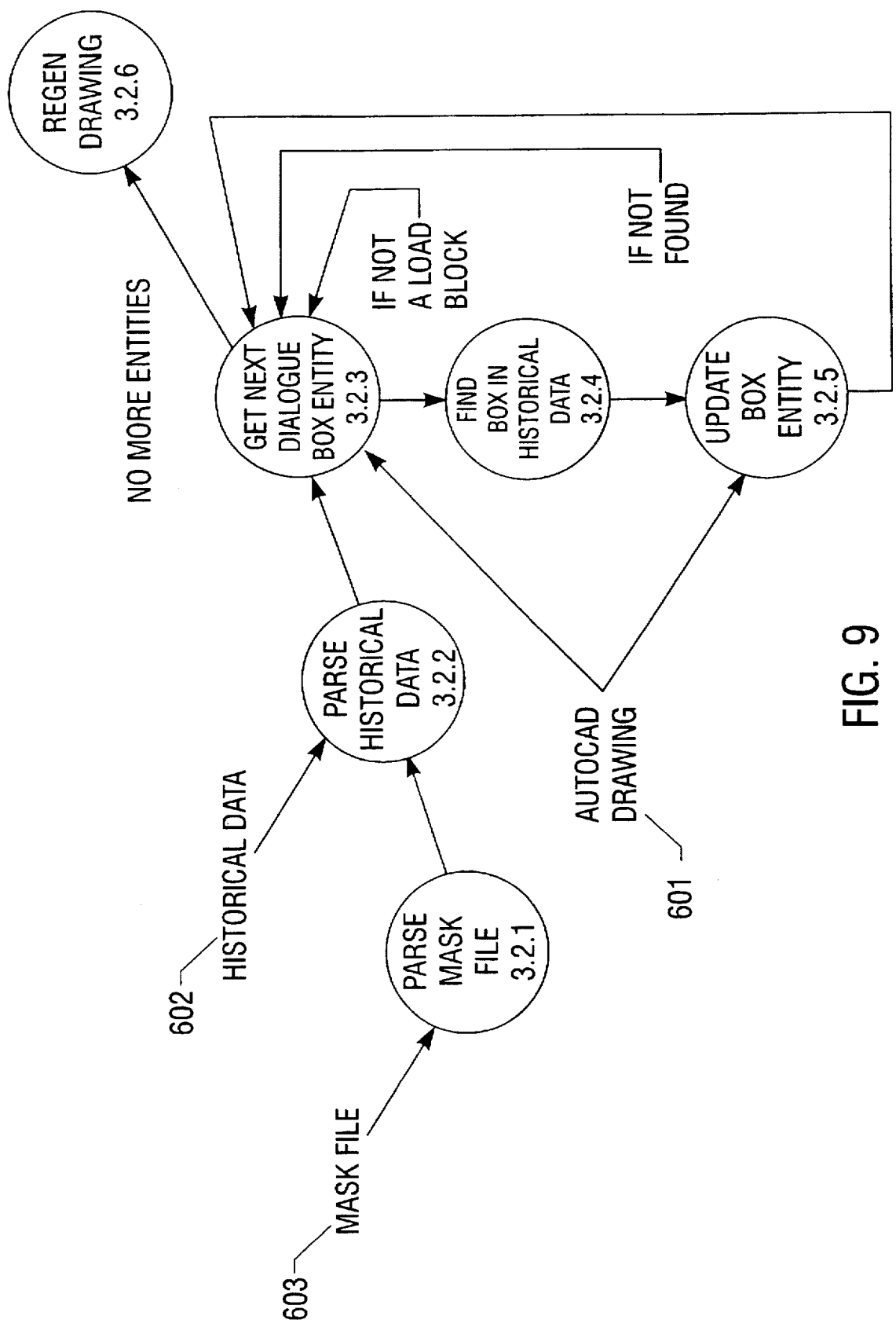

FIG. 9 is a flow chart showing in more detail the load drawing function of FIG. 8.

Figure 10:
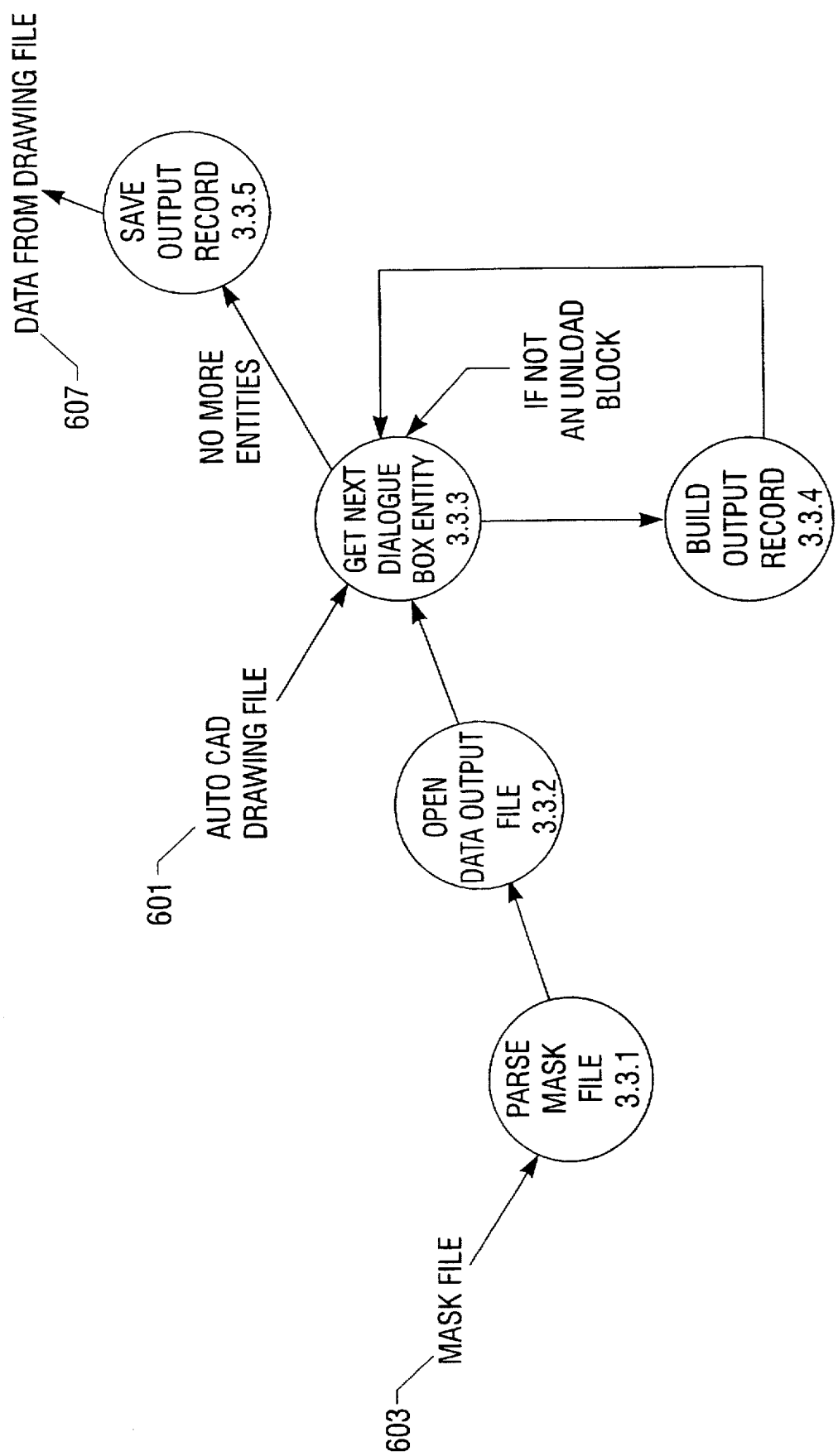

FIG. 10 is a flow chart showing in more detail the unload drawing function of FIG. 8.

DETAILED DESCRIPTION

Figure 1:
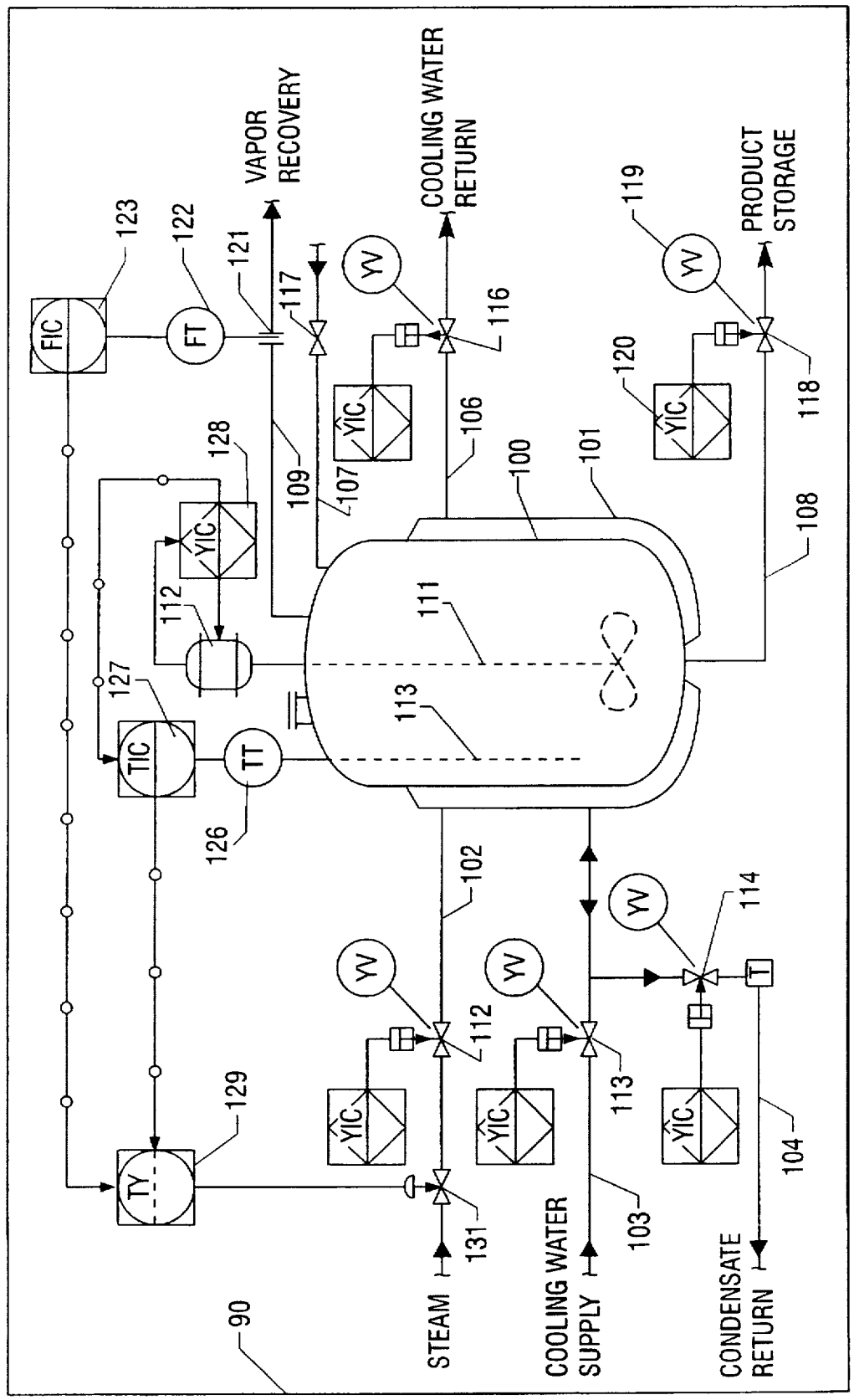
FIG. 1 is an example of a graphical display of a process and instrumentation diagram.

Referring to FIG. 1, there is shown a screen from a computer display 90 which illustrates a loop sheet in the form of a process and instrumentation diagram (P&ID), for a batch kettle control. In FIG. 1, the bold lines indicate pipes or conduits for liquid, steam or vapor, the fine lines indicate hardware connections, and the fine lines with circles indicate software connections.

The screen display of FIG. 1 shows kettle 100 surrounded by steam jacket 101, which is connected to steam line 102, cooling water supply line 103, condensate return line 104, and cooling water return 106. The input of unprocessed product is illustrated by use of charge header line 107, and processed product is removed for storage via outflow line 108. Also illustrated is vapor recovery line 109.

Within kettle 100 is illustrated stir bar 111 which is driven by motor 112. Also within kettle 100 is temperature sensor 113.

Illustrated in the P&ID of FIG. 1 are several process operation components illustrated using standard process instrumentation symbols.

For example, lines 102, 103, 104, 106, 107 and 108 each respectively include valves 112, 113, 114, 116, 117 and 118. Each valve has associated therewith a valve state indicator (YV) and a valve indicator and controller (YIC). For example, outflow line 108 includes outflow valve 118 which has associated therewith a valve state indicator (YV) 119, and a valve indicator and controller (YIC) 120.

Vapor recovery line 109 includes a flow transducer 121 which is connected through flow transmitter (FT) 122 to flow rate indicator and controller (FIC) 123.

Temperature indicator 113 is connected through temperature transmitter (TT) 126 to temperature indicator and controller (TIC) 127. Also provided to TIC 127 is the control output of valve indicator and controller (YIC) 128, which is connected to monitor motor 112.

Finally, the software control outputs of FIC 123 and TIC 127 are applied to temperature converting relay (TY) 129 which is illustrated as controlling valve 131 within steam line 102.

Associated with each component illustrated in the P&ID of FIG. 1, for example, associated with each valve, valve state indicator (YV), indicator and controller (YIC), sensed signal transmitter (TT, FT), and flow or temperature indicator and controller (FIC, TIC), are so-called process attributes which completely define the identity and state of the particular component. In other words, associated with each graphical or icon representation of a control element in a P&ID such as that illustrated in FIG. 1, are one or more process attributes.

For example, process attributes may include the name of the control element, the type, part number, and manufacturer of the control element, reference to the drawing for the control element, if the control element is a physical element, the type of signal output by the control element (for example, analog or digital), the engineering units for the signal or signals produced by the control element as well as the range for the output signal, the high and low alarm limits

4 for the output signal, the value of the output signal at a particular point in time, the last time the control element was maintained, and so forth. There are virtually an infinite number of different types of process attributes for the possible control elements used in processing plants. In general, the process attributes reveal the identity, characteristics and/or state of a respective control element.

In accordance with the present invention, rather than requiring a control system designer or processing plant operator to search through an extensive history data base to determine the particular process attributes for the control element or elements of interest, the present invention allows selected process attributes to be formatted and displayed along with the graphical representation of the operation (for example, the P&ID sheet of the operation under consideration). By using a user positionable cursor or crosshair, a user may select a desired control element for which the underlying process attributes are to be displayed.

Figure 2:
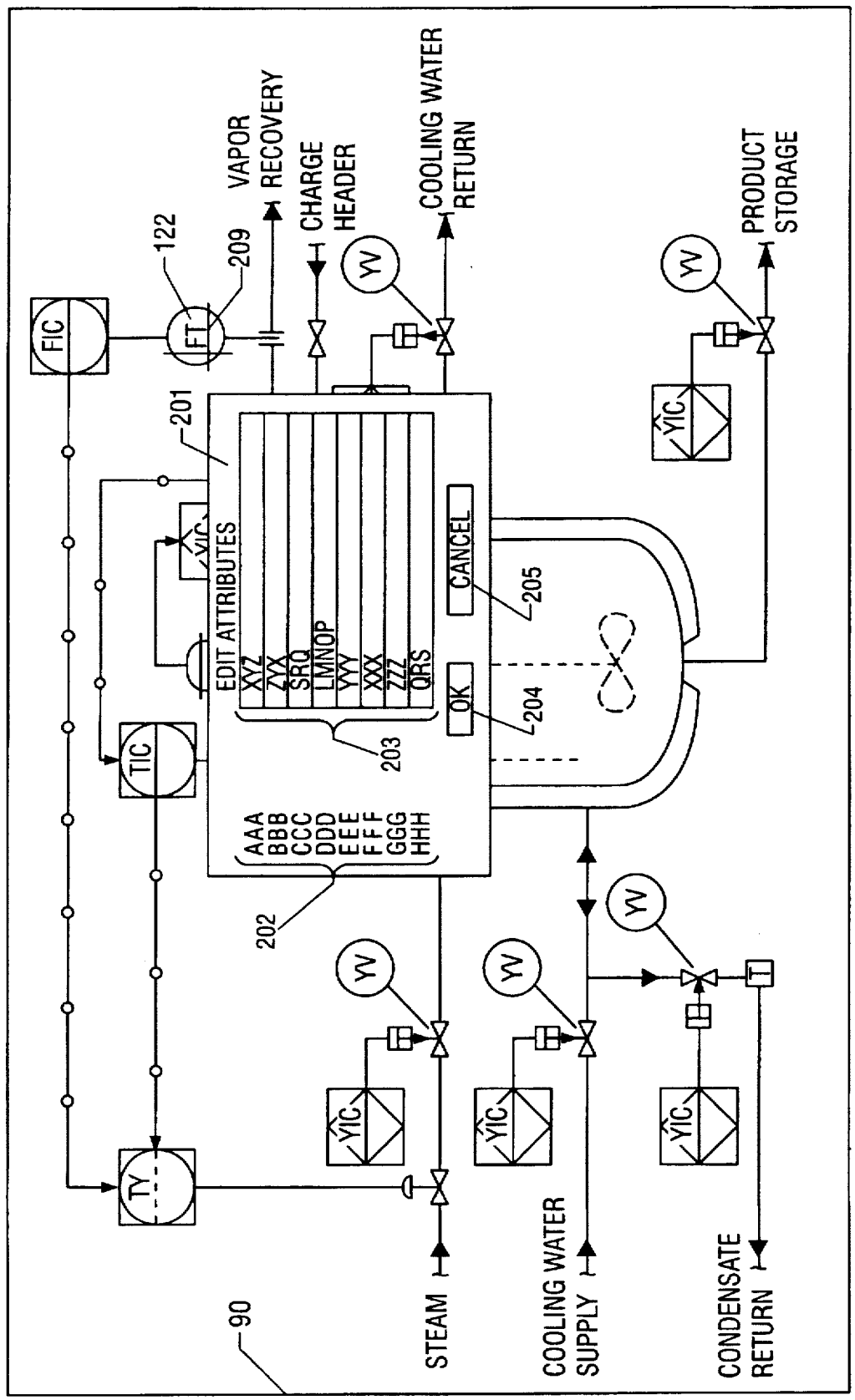
FIG. 2 is an example of a graphical display of a loop sheet with a graphical attribute interface, in accordance with the present invention.

For example, and with reference to FIG. 2, an embodiment of the present invention contemplates the use of a cursor (such as cross-hairs 200) which is selectively placeable anywhere on the image of the P&ID sheet by use of a mouse, key board, joy stick, or other user input device, in order to select a particular control element of interest (for example, FT 122). Once a desired control element has been selected, a dialogue box 201 is displayed overlying the graphical representation of the P&ID sheet. Dialogue box 201 may take any form, however, in the preferred embodiment, dialogue box 201 includes at least two fields; a process attribute identity field 202 and a process attribute value field 203. Identity field 202 includes a brief description of the identity of the process attribute of interest, the value for which is displayed in the relevant entry of process attribute value field 203. Dialogue box 201 also includes graphical instruction boxes 204 and 205 with which the user may change or set attribute values by selecting an attribute value field 203 and entering a new value. Once changes have been made to values within field 203, selecting box 204 ("OK") saves the new values or selecting box 205 ("CANCEL") retains the original values. In any case, selecting box 204 then box 205 closes the dialogue box 201.

FIGS. 3, 4 and 5 present examples of different types of dialogue boxes 201 which are illustrative of dialogue boxes that may be displayed for various control elements revealed in the P&ID sheet of FIG. 1. It should be understood that for each dialogue box illustrated in FIGS. 3, 4 and 5, more or fewer process attribute identifiers may be included within the process attribute identification field, which would result in more or fewer process attribute values being displayed in the process attribute value fields.

Referring specifically to FIG. 3, presented is an exemplary dialogue box 201A which may be overlaid on the P&ID sheet of FIG. 1 (as illustrated in FIG. 2), if the flow transmitter (FT) 122 was selected by the user for display of underlying attributes.

In dialogue box 201A, process attribute identification field 202A includes a "tag" entry, with the corresponding value in field 203A being the tag that appears on the P&ID sheet for FT 122. Other attribute identifiers and values appearing in fields 202A and 203A indicate that FT 122 produces an output signal that is analog. The "device" and "address" entries in fields 202A and 203A indicate the hardware box actually housing the transmitter, and the address within that box. Finally, attribute identification and value fields 202A and 203A include entries for the engineering units of the output signal of FT 122 (ma), and the high and low values permitted for the output signal, in the specified engineering units.

Referring now to dialogue box 201B in FIG. 4, presented is an exemplary dialogue box which may be displayed when the user selects product outflow valve 118 of the P&ID sheet of FIG. 1 for display of underlying attributes.

Process attribute identification and value fields 202B and 203B include entries that identify the name, type, part number and manufacturer of the valve in interest. In addition, the identification of the valve specification sheet is provided. Finally, fields 202B and 203B include entries for the last maintenance date for outflow valve 118.

The dialogue boxes 201A and 201B shown in FIGS. 3 and 4 do not include process attributes that vary as the process proceeds. In other words, the process attributes are static rather than dynamic. The "Maintenance Date" entry in dialogue box 201B is periodically updated when the outflow 118 is maintained, but the other entries in dialogue box 201B do not vary as the process continues.

In contrast, other control elements, including control elements presented in icon form in the P&ID sheet of FIG. 1, do include process attributes that vary with time (i.e., dynamic attributes). For example, flow rate indicator and controller 123 produces an output signal which is indicative of the vapor flow rate detected by flow sensor 121 and transmitted by flow transmitter 122.

FIG. 5 presents an exemplary dialogue box 201C for flow rate indicator and controller 123. Similar to dialogue boxes 201A and 201B of FIGS. 3 and 4, dialogue box 201C for flow indicator and controller 123 reveals several process attributes that do not vary as the process proceeds. However, dialogue box 201C includes a process attribute identified as "Process Variable" with a corresponding value. This value (in units of gallons per minute) varies in proportion to the flow of vapor in line 109 as sensed by flow sensor 121 and as transmitted by flow transmitter 122, and will thus vary as the process under control proceeds. In a similar fashion, although the "Set Point", "High Alarm", and "Low Alarm" entries in dialogue box 201C are typically fixed throughout the duration of a control process, these values may either be changed by the operator or may be changed automatically under software control at any time.

As explained earlier, a data historian maintains values for these process attributes in a history data base in a known manner. The present invention operates to select and format particular process attributes for presentation in dialogue boxes which are overlaid upon the display of the loop sheet or P&ID sheet of interest. This provides a graphical display of process attributes for any point in time that is recorded in the history data base.

Figure 6:
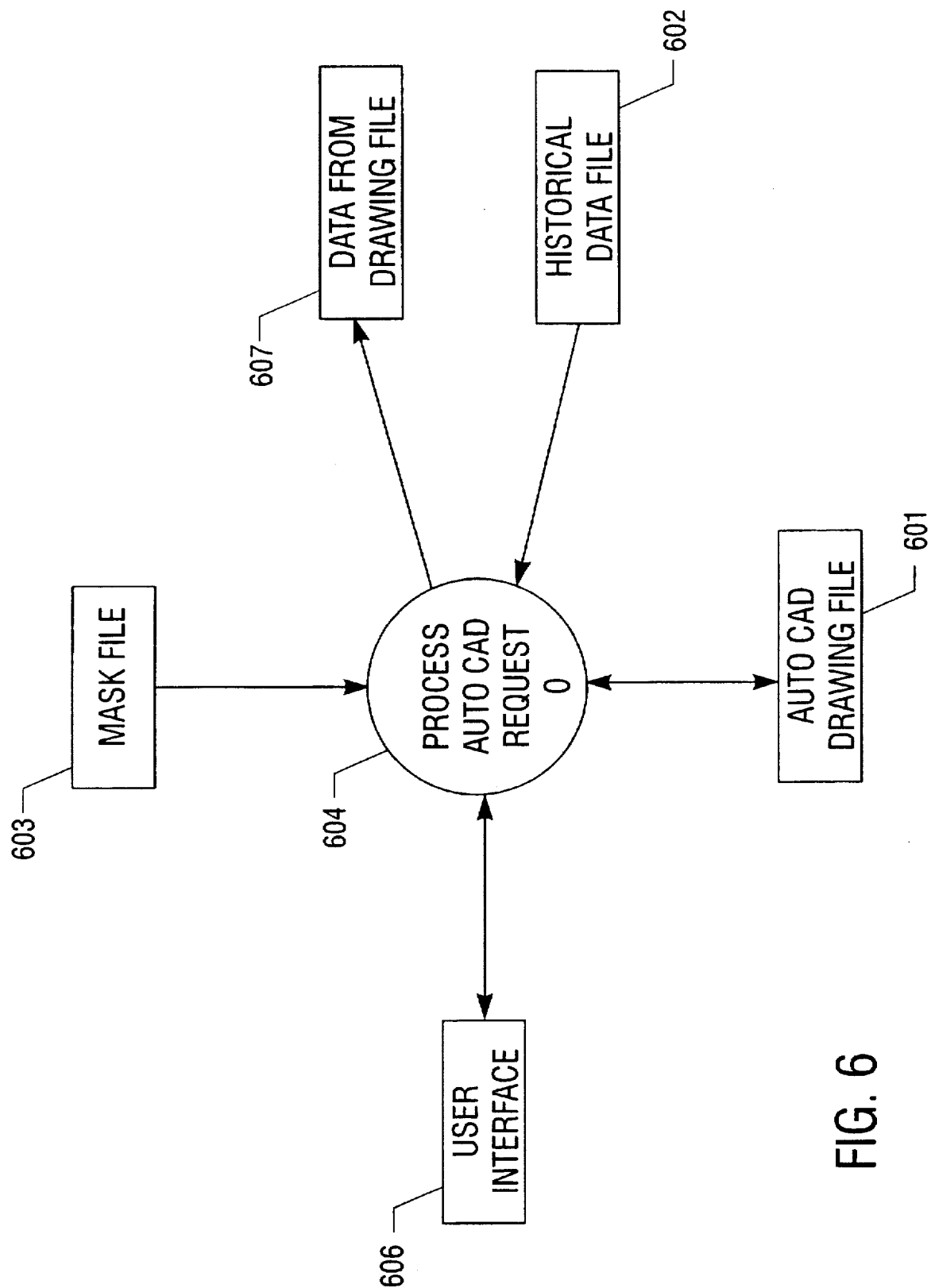
FIG. 6 is a system block diagram showing the functional requirements for implementing the graphical attribute interface which is used by the present invention.

Referring now to FIG. 6, there is shown in functional block diagram form the graphical display of process attributes according to the invention. The key parts of the invention are an AutoCAD drawing file 601, a data historian or historical data file 602, a mask file 603, and a processor 604 which processes user requests input through interface 606 to produce drawings including graphical representation of process attributes. These drawings are stored in AutoCAD drawing file 601, and are constructed from the AutoCAD drawing file 601, historical data file 602, and mask file 603, as described in more detail below. Drawing data file 607 is used to store a representation of the process attributes refined by mask file 603.

Historical data file 602 contains attribute data which is to be loaded into the drawing. The data is organized by records, and each record contains a number of fields as defined by the mask file 603. The mask file 603 contains the definition of the structure records in the historical data file 602. The record definition is the list of attributes in each record in the historical data file. Attributes in the record which are proceeded by a special marking character (for example, a "@" character) are used as the key attributes for loading data from the historical data file 602.

In the preferred embodiment, the invention uses the interface provided in the AutoCAD Development System provided as part of AutoCAD release 11, and provides a mechanism for keeping process documentation up to date with the process itself. The invention allows a user to load and unload the process data directly into and out of process drawings. The preferred embodiment is designed to operate on the Fisher Controls ENVOX Open Database product, however, those of skill in this art will be able to apply the invention to other spread sheet and data base applications without undue experimentation.

The invention uses the concept of "key attributes" which refers to the process attribute within a block of attributes whose value—the "key value"—designates the block for use in a drawing function, whether a load or an unload drawing function (described in detail with reference to FIGS. 9 and 10).

Referring now to FIGS. 7–10, presented is a flow chart of the logic of the graphical attribute interface according to the invention implemented in software. One of ordinary skill in the art may write source code from this flow chart in any suitable computer program language, such as Pascal, C, or FORTRAN for any desired computer system, such as IBM PC's or IBM compatible computers or other computers which support these computer languages.

The process begins by initializing the user interface in step 1. This is done in accordance with the standard AutoCAD Development System interface procedures. Control then passes to step 2 where user input is awaited. Once user input is received, control passes to step 3 where the user request is processed. Step 3 uses as inputs, the historical data file 602, the mask file 603, the AutoCAD drawing file 601, and/or process attribute data from the drawing 607.

FIG. 8 shows in more detail the processing of the process user request (step 3) of FIG. 7. Beginning in step 3.1, the function code of the entered request is determined, and control passes either to the load drawing function 3.2 or the unload drawing function 3.3, which are described in more detail with reference to FIGS. 9 and 10. After either the load drawing function 3.2 or unload drawing function 3.3 is completed, control passes to block 3.4 where drawing clean up is performed including, for example, releasing memory allocated for data structures and closing open files. Processing then ends.

Referring now to FIG. 9, the load drawing function 3.2 of FIG. 8 is described in more detail. Beginning in block 3.2.1, the mask file 603 is parsed. In other words, the mask file 603 is read and a structure is created from the mask file that defines the meaning of each item of data in historical data file 602. Control then passes to block 3.2.2 where the historical data file 602 is parsed according to the information contained within mask file 603. Control then passes to block 3.2.3 where the updating of dialogue boxes included in the AutoCAD drawing file 601 is begun.

In block 3.2.3, the first dialogue box to be updated is determined from information in the mask file 603, historical data file 602 and AutoCAD drawing file 601. Control then passes to block 3.2.4 where the attribute data for the dialogue box under consideration is found in the historical data file. Control then passes to 3.2.5 where the dialogue box is updated. Control then loops back to block 3.2.3 for continued operation, until no additional dialogue box entities are discovered. Control then passes to block 3.2.6 where the AutoCAD drawing is regenerated and displayed.

Turning now to FIG. 10, the unload drawing function 3.3 of FIG. 8 is described in more detail. Beginning in block 3.3.1, the mask file is parsed to establish the format of data to be output from AutoCAD drawing file 601 to the data from drawing file 607, and control passes to 3.3.2 where the data from drawing file 607 is opened. Then, in block 3.3.3, the AutoCAD drawing is reviewed in accordance with the parsed mask file data to identify each dialogue box. For each identified dialogue box, control then passes to block 3.3.4 where an output record is built from the dialogue box identified in block 3.3.3. Looping control continues in blocks 3.3.3 and 3.3.4 until no more dialogue boxes are found in AutoCAD drawing 601. Control then passes to block 3.3.5 where the output record is saved, in accordance with the parsed mask file 603, in the data from drawing file 607 established in block 3.3.2.

Although the present invention is described with reference to a single preferred embodiment, it will be understood by those of skill in this art that modifications, deletions and additions can be made to this preferred embodiment without departing from the spirit and scope of the invention.

What is claimed is:

1. A method of generating graphical display of process attributes in a computer-based process controller, comprising:

storing a history of underlying process attributes for a plurality of points in time during the operation of a process being controlled;

displaying a graphical representation of said process being controlled;

selecting a portion of the graphical representation and a point in time for which underlying process attributes from said history are to be displayed; and displaying said underlying process attributes of the selected portion of the graphical representation for the selected point in time, substantially simultaneous with the display of said graphical representation.

2. The method of claim 1, wherein said step of displaying said process attributes comprises, overlaying indicia of said process attributes over said graphical representation.

3. The method of claim 1, said graphical representation comprising icons of process elements, said step of selecting a portion of the graphical representation comprising, selecting an icon of a process element for which underlying process attributes are to be displayed.

4. The method of claim 3, wherein said underlying process attributes include an identification of a corresponding process element, characteristics of said corresponding process element, and states of said corresponding process element.

5. A system for formatting and displaying process attribute data with graphical process data, comprising:

a drawing file including at least one graphical representation of a process being controlled, said at least one drawing including a plurality of process elements;

an historical data file in which is stored historical data related to process attributes underlying each of said plurality of process elements for a plurality of points in time;

a mask data file including information which relates said historical data to corresponding process elements in said at least one graphical representation; and a data processor, operatively connected to said drawing file, historical data file and mask file, for combining said at least one graphical representation with said historical data according to said information in said mask file, to produce a combined display of said of at least one graphical representation with process attributes underlying at least one of said plurality of process components for a selected point in time.

\* \* \* \* \*